United States Patent
Hammad et al.

(10) Patent No.: US 9,861,910 B2
(45) Date of Patent: Jan. 9, 2018

(54) CYCLONE SEPARATION AND RECOVERY OF CARBON DIOXIDE FROM HEATED LIQUID ABSORBENT

(71) Applicant: Saudi Arabian Oil Company, Dhahran (SA)

(72) Inventors: Ahmad D. Hammad, Dhahran (SA); Abdul Rahman Zafer Akhras, Dhahran (SA); Zaki Yusuf, Dhahran (SA); Nayif A. Rasheedi, Dhahran (SA); Amjaad Al-Qahtani, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 371 days.

(21) Appl. No.: 14/572,267

(22) Filed: Dec. 16, 2014

(65) Prior Publication Data
US 2016/0166951 A1    Jun. 16, 2016

(51) Int. Cl.
*B01D 53/14* (2006.01)
*B01D 19/00* (2006.01)

(52) U.S. Cl.
CPC ..... *B01D 19/0057* (2013.01); *B01D 19/0068* (2013.01); *B01D 53/1425* (2013.01); *B01D 53/1475* (2013.01); *Y02C 10/06* (2013.01)

(58) Field of Classification Search
CPC .......... B01D 53/1425; B01D 53/1475; B01D 19/0057; B01D 19/0068; Y02C 10/06
(Continued)

(56) References Cited

U.S. PATENT DOCUMENTS 4,278,550 A * 7/1981 Watts .................. B01D 17/0217
                                                                210/104
6,165,433 A    12/2000 Chakravarti et al.
(Continued)

FOREIGN PATENT DOCUMENTS

| WO | 20131000953 A2 | 1/2013 |
|---|---|---|
| WO | 102010047606 A1 | 8/2013 |
| WO | 2013144840 A1 | 10/2013 |

OTHER PUBLICATIONS

Veneman et al., "Continuous CO2 capture in a circulating fluidized bed using supported amine", Chem. Eng. Journal (2012), pp. 1-9.
(Continued)

*Primary Examiner* — Frank Lawrence
(74) *Attorney, Agent, or Firm* — Abelman, Frayne & Schwab

(57) ABSTRACT

A process and system for improving the efficiency of regenerating a $CO_2$-rich liquid absorbent stream following contact in an absorption zone with, e.g., a flue gas stream from which it has absorbed $CO_2$, and recovering a substantially pure stream of includes passing the pressurized liquid sorbent through a heating zone to heat it to the desorption temperature, e.g., to about 80°-85° C. for aqueous $K_2CO_3$ sorbent, introducing the heated liquid sorbent into a cyclone separation zone where the combination of increased temperature, reduced pressure and the centrifugal forces on the liquid/gas mixture result in a relatively more rapid and efficient separation of the $CO_2$ from the liquid sorbent from which it has been released. The $CO_2$-lean liquid sorbent descends to the bottom of the cyclone separator and is recovered, cooled and recycled to the absorption zone; the $CO_2$ withdrawn from the cyclone separation zone passes through a condenser to remove moisture and any other
(Continued)

condensates present, and the $CO_2$ is recovered for storage or use in downstream processes.

11 Claims, 6 Drawing Sheets

(58) Field of Classification Search
USPC ......... 95/156, 178, 179, 183, 185, 236, 257, 95/261, 269, 271; 423/228, 229
See application file for complete search history.

(56) References Cited

U.S. PATENT DOCUMENTS

| | | | |
|---|---|---|---|
| 7,056,482 | B2 | 6/2006 | Hakka et al. |
| 8,337,603 | B2 | 12/2012 | Akhras et al. |
| 8,512,660 | B2 | 8/2013 | Engelke et al. |
| 2007/0151453 | A1* | 7/2007 | Fukuma ................ B01D 45/12 95/271 |
| 2010/0319531 | A1 | 12/2010 | Iijima et al. |
| 2012/0027664 | A1 | 2/2012 | Pinard Westendorf et al. |
| 2012/0125194 | A1 | 5/2012 | Caram et al. |
| 2012/0132443 | A1 | 5/2012 | Van Straelen |
| 2013/0139695 | A1 | 6/2013 | Chang et al. |
| 2013/0202517 | A1 | 8/2013 | Ayala et al. |
| 2013/0269526 | A1 | 10/2013 | Lustig et al. |
| 2013/0323148 | A1 | 12/2013 | Vipperla |
| 2014/0205525 | A1* | 7/2014 | Kortunov ........... B01D 53/1475 423/228 |
| 2014/0374105 | A1* | 12/2014 | Van Straelen ..... B01D 53/1456 166/305.1 |

OTHER PUBLICATIONS

Stern et al., "Electrochemically Mediated Separation for Carbon Capture", Energy Procedia, 4, (2011), pp. 860-867.

Li et al., "Carbon dioxide capture-related adsorption and separation in metal-organic frameworks", Coordination Chemistry Reviews, 255, (2011), pp. 1791-1823.

Benemann et al., "Utilization of Carbon Dioxide from Fossil Fuel-Burning Power Plants with Biological Systems", Energy Converse. Manage., 34, (1993), pp. 1513-1528.

Huang et al., "Dual Alkaline Approaches for the Capture and Disposal of CO2", Journ. of Environmental Science & Health Part a—Toxic/Hazardous Subs. & Env. Eng., pp. 660-664, date not provided.

International Search Report and Written Opinion dated Feb. 19, 2016 in corresponding International Application. PCT/US2015/064592.

* cited by examiner

CYCLONE SEPARATION AND RECOVERY OF CARBON DIOXIDE FROM HEATED LIQUID ABSORBENT

RELATED APPLICATIONS

None

BACKGROUND OF THE INVENTION

1. Field of the Invention

This invention relates to the separation of $CO_2$ from liquid absorbents and the recovery of substantially pure $CO_2$ for sequestration or other processing to prevent its release into the atmosphere.

2. Description of Related Art

A number of processes have been developed that employ a liquid sorbent for the capture of carbon dioxide from combustion flue gases emanating from electrical power generation plants and other industrial sources. After the $CO_2$ has been absorbed/adsorbed, it is transferred to a desorption unit where it is typically heated to a higher temperature to release substantially pure $CO_2$ which can then be recovered for further processing. Typical $CO_2$ sorbents contact the flue gases at an initial temperature of from about 30° C. to 40° C., and thereafter the temperature of the $CO_2$-rich liquid sorbent is typically raised to the range of from 100° C. to 125° C. to desorb the $CO_2$ gas. The liquid sorbent temperature can be increased to the desorption range by contact with a heat exchanger.

The energy required to desorb the $CO_2$ from the $CO_2$-rich liquid sorbent must be supplied in the form of heat from other systems in the power generation facility and the hot $CO_2$-lean absorbent liquid must be again reduced in temperature before it can be returned to contact the flue gases. Studies of commercial power generation facilities have shown that even the most effective and efficient systems for the recovery of $CO_2$ from flue gases and recycling of the liquid sorbent result in a significant drop in the overall efficiency of the power generation facility as compared to operating the same facility without $CO_2$ capture to reduce the $CO_2$ released into the atmosphere.

A problem therefore exists concerning the amount of energy consumed by the present power generation systems and methods for the regeneration of liquid sorbents used to capture and recover $CO_2$ from flue gases.

A process is disclosed in U.S. Pat. No. 8,512,660 (the '660 patent) that employs a cyclone separator having pressure controlling means to selectively recover methane from a liquid sorbent that also contains $CO_2$ separated from a biogas. In the absorptive removal of carbon dioxide from a methane biogas using a scrubbing liquid or sorbent, as much as 10% of the methane present in the biogas can also be absorbed. With careful maintenance of the temperature at which the liberation of $CO_2$ begins, effective separation of only methane from the $CO_2$ and methane-rich scrubbing solution can be achieved, e.g., with the first 1% to 2% of liberated $CO_2$, virtually all of the absorbed methane is released from the liquid sorbent. After this temperature-controlled heating, the $CO_2$-rich and methane-containing liquid sorbent is fed to a centrifugal separator for separating the methane gas from the liquid phase, wherein methane and a small fraction of the dissolved $CO_2$ escape via the gas phase. The gas phase is recovered and passed to the absorber unit where it is mixed with the fresh crude biogas. Thereafter, the liquid phase removed from the centrifugal separator, which is a virtually methane-free $CO_2$-rich liquid sorbent, is passed through a second heat exchanger and there it is heated to the required $CO_2$ desorption temperature and the sorbent is thereby regenerated in the desorption unit and recycled to the absorption unit.

In one embodiment of the '660 patent, the pressure of the gas phase in the cyclone separator is controlled, so that temperature fluctuations in the centrifugal separator and changes in the gas loading of the liquid sorbent that is fed can be compensated for by the pressure controller.

Thus, the '660 patent is directed to the problem of separating the 10% or so of methane from the $CO_2$ in a liquid absorbent that has been used to treat a biogas by reliance on the differences in the kinetics and solubility parameters that lead to a much more rapid desorption of methane. The '660 patent employs the conventional prior art method of heating the $CO_2$-rich liquid sorbent to a high enough temperature in the desorption unit to release the $CO_2$. Here again, the energy consumed in heating and cooling the liquid sorbent must be charged against the process when calculating the overall efficiency of the system.

Thus, a need exists for an improved system and method that can receive a stream of $CO_2$-rich liquid sorbent and process it more efficiently than current systems to strip the $CO_2$ from the liquid sorbent to a predetermined concentration for recycling and also recover a substantially pure stream of $CO_2$ with a lower energy consumption than possible using presently known methods.

Specifically, the problem to be addressed by the present invention is how to reduce the energy consumption and improve the efficiency of the $CO_2$ capture and recovery process in a conventional combustion flue gas by reducing the temperature to which the $CO_2$-rich liquid sorbent must be heated to desorb a predetermined proportion of the absorbed $CO_2$ so that the $CO_2$-lean liquid sorbent can be recycled to contact the flue gas.

SUMMARY OF THE INVENTION

The above problems are resolved and other advantages are provided by the method and system of the present invention in which the $CO_2$-rich liquid sorbent following contact with the flue gas passes as a pressurized stream through a heating zone in which the temperature of the liquid sorbent is raised to a predetermined temperature, e.g., in one preferred embodiment to about 85° C., and is then introduced under reduced pressure into a cyclone separator of the general type that is disclosed in U.S. Pat. No. 8,337,603. The combination of the centrifugal force, the increased temperature and the reduced pressure on the liquid/gas mixture results in a relatively more rapid and efficient separation of the $CO_2$ from the liquid sorbent from which it has been released. The liquid sorbent descends to the bottom of the cyclone separator and is recovered as a $CO_2$-lean sorbent stream that is cooled and recycled to the absorption unit. The $CO_2$-containing gas stream is withdrawn from the cyclone and is passed through a condenser to remove any moisture and other vapors that are present. The substantially pure $CO_2$ is then recovered for storage or further processing downstream.

The process of the invention broadly comprehends passing a pressurized $CO_2$-rich liquid sorbent stream through a heating zone, typically under turbulent flow conditions, to increase its temperature to a value that is less than the temperature at which the $CO_2$ would be substantially completely desorbed at the system pressure; transitioning the heated $CO_2$-rich liquid sorbent stream from the turbulent flow condition to a generally linear flow in a transition zone and then to a rotational flow condition in a downwardly spiraling flow path that subjects the liquid sorbent to centrifugal forces while also forming a cyclone, and simultaneously withdrawing in an upward gas flow path the $CO_2$, water vapor and any other trace gases desorbed from the liquid sorbent; passing the $CO_2$-containing gas stream though a condensing zone to condense and remove water and any other liquids present; and recovering from the condensing zone a substantially pure $CO_2$ stream.

The apparatus and system of the invention includes a heating zone with at least one heat exchanger and associated temperature controller, the heating zone with one or more exchangers having an inlet for receiving the $CO_2$-rich liquid sorbent stream from the flue gas contact absorption zone and an outlet for discharging the $CO_2$-rich liquid sorbent at a predetermined temperature; a sorbent conduit from the outlet of the heat exchanger; and a cyclone separator having an inlet in fluid communication with the sorbent conduit outlet. In a preferred embodiment, the cyclone separator is configured and dimensioned to minimize any turbulent flow of the heated $CO_2$-rich liquid sorbent stream received from the heating zone, and to pass the liquid sorbent stream through a transition zone where it undergoes transition from a generally linear flow path to a rotational flow condition as it enters a downwardly spiraling flow zone which subjects the liquid sorbent to centrifugal forces, while simultaneously reducing the pressure on the surface of the liquid sorbent.

A pressure reducing means, e.g., a pump in fluid communication with the $CO_2$-containing gas and vapor stream can be used to pass the stream to a condenser in a condensing zone downstream of the cyclone separator. The condenser is maintained at a temperature that is effective to condense substantially all of the desorbed water and/or other vaporized compounds carried over from the liquid sorbent. The condensing zone includes, respectively, outlets for discharging a substantially pure stream of $CO_2$ that is recovered for further processing and the condensate.

It has been found that the configuration of the cyclone separator disclosed in U.S. Pat. No. 8,337,603 (the '603 patent), when modified as described in detail below, can be utilized to effectively desorb and separate $CO_2$ from a heated liquid sorbent stream in a highly efficient manner, even though the temperature of the $CO_2$ liquid sorbent is substantially less than the temperature at which the $CO_2$ would be desorbed at atmospheric pressure.

This utility and the improved efficiency of the cyclone separator of the '603 patent is surprising. It is also a departure from the mode of operation and use described in the '603 patent which was directed to the conditioning of an oil and water mixture to promote droplet coalescence as well as the separation of a gaseous component as part of a gas/oil separation plant, or GOSP. In the production of crude oil from reservoir rock the liquid crude oil is accompanied by petroleum gases and also includes some proportion of water. The multiple-phase fluid consisting of oil, gas and water is treated downstream of the wellhead in a GOSP to remove as much of the water with its dissolved salts as possible, since the salts are highly corrosive to oil field and refinery equipment.

In the practice of the method of the present invention, the $CO_2$-rich liquid sorbent stream initially is transported with substantially no gaseous component, since the $CO_2$ is bound to the absorbent molecules. In the first step of the process, the temperature of the $CO_2$-rich liquid sorbent is increased to a predetermined value that will result in the release of $CO_2$ molecules downstream under the reduced pressure conditions and centrifugal forces in the cyclone separator of the invention. The amount of heat supplied to the pressurized sorbent stream is predetermined to provide sufficient energy to break the attraction bonds between the $CO_2$ and the particular sorbent used in the process. The application of the cyclonic effect creates a centralized low pressure zone in the apparatus that serves to reduce the vapor pressure of the $CO_2$ at the surface of the flowing liquid absorbent, while also moving the $CO_2$ molecules away from the surface to provide a dual effect that drives the mass transfer of the free $CO_2$ molecules from the liquid sorbent, and their upward movement away from the descending $CO_2$-lean liquid sorbent to exit the upper region of the cyclone separator.

The liquid sorbent passing through the heat exchanger will experience turbulent flow conditions in order to efficiently increase its temperature to the desired level. The heated liquid sorbent discharged from the heat exchanger preferably enters a sorbent conduit where it transitions from a state of turbulent flow to a generally more linear flow condition. In order to minimize the creation of turbulence, the sorbent conduit preferably is configured as a linear passage without elbows or sharp bends prior to its outlet and the discharge of the heated sorbent into the body of the cyclone separator.

The cyclone separator preferably includes a pre-rotational element that provides a smooth transition from the sorbent conduit, thereby maintaining and further promoting the linear flow of the heated $CO_2$-rich sorbent. It has been found that minimizing turbulent flow conditions will increase the separation efficiency of the $CO_2$ and, hence, the presence of turbulent flow conditions in the cyclone portion of the separator will decrease the $CO_2$ desorption efficiency.

As will be understood by one of ordinary skill in the art, the sorbent conduit described above can be fabricated as a portion of the cyclone separator, rather than as a separate length of pipe, based on considerations of cost, plant layout, and placement of the system components.

As the heated liquid sorbent passes from the pressurized condition in the sorbent conduit into the pre-rotational portion of the separator, the cross-sectional area is increased and the pressure on the surface of the liquid is immediately reduced, thereby promoting the desorption of the $CO_2$. The liquid enters the rotational section of the separator and passes through an intermediate outlet into the vertical section. The cyclone effect is maintained to further promote the desorption of the $CO_2$ and water vapor from the liquid sorbent. The $CO_2$ and water vapor, along with any other vapors released, passes out of the top of the vertical cyclone portion of the separator and through a gas vapor discharge conduit into the condenser where the water and any other vapors are liquefied and recovered as a separate stream while the essentially pure $CO_2$ stream is recovered for sequestration, storage and/or other downstream uses.

The $CO_2$-lean sorbent is recycled to the absorption unit at a temperature of about 40° C. or lower after passage through one or more heat exchanger.

The ability to effect $CO_2$ separation at a lower temperature results in a proportional saving of energy, and also extends the life of the liquid sorbent and the use of less sorbent in the system. The size and associated capital costs of the system of the invention for treating a given volume of liquid sorbent can thereby be reduced relative to prior art systems.

BRIEF DESCRIPTION OF THE DRAWINGS

The invention will be described in more detail below and with reference to the attached drawings, in which.

DETAILED DESCRIPTION OF THE INVENTION

Figure 1:
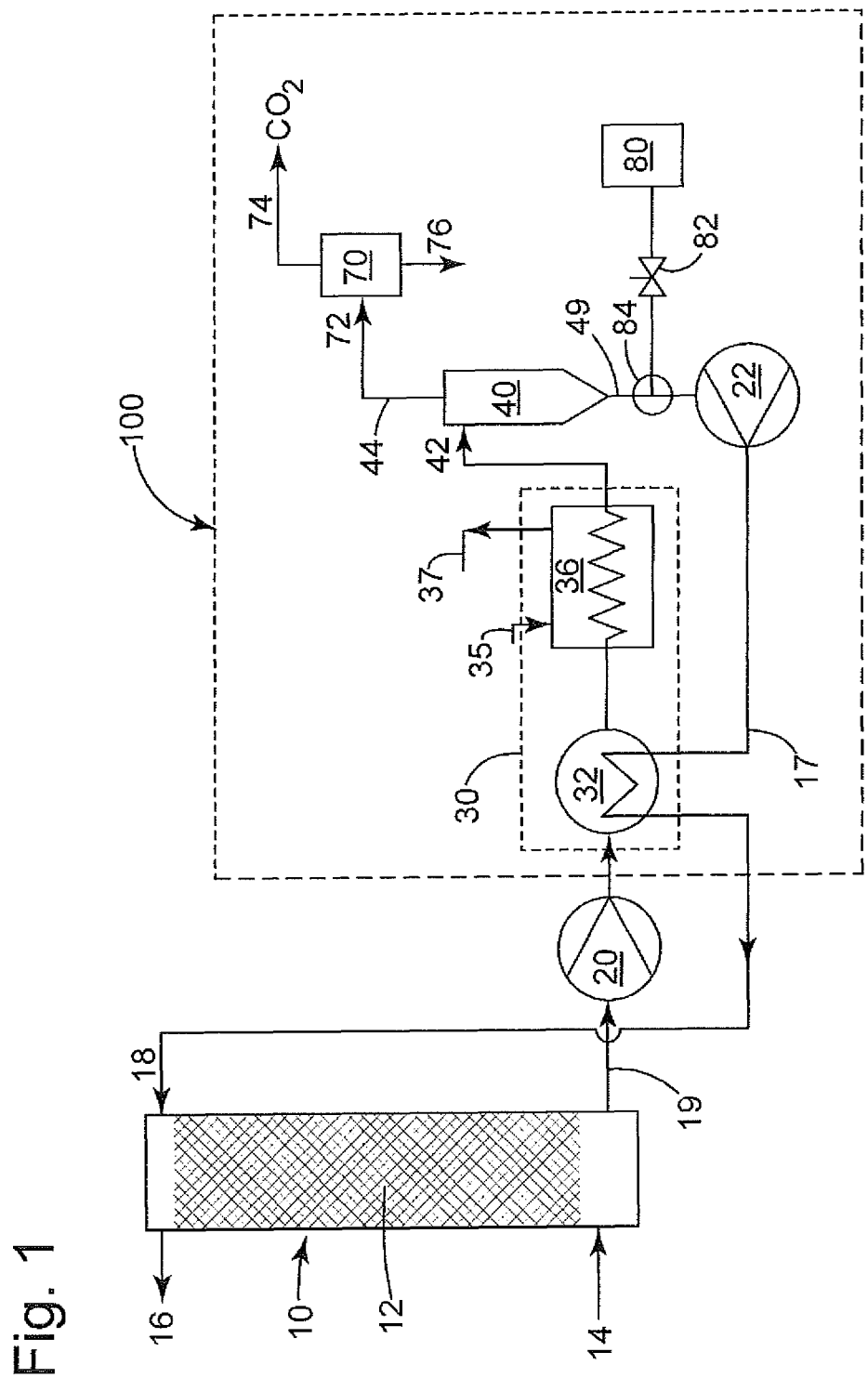
FIG. 1 is a simplified schematic diagram of an embodiment of the system of the invention for use in regenerating a $CO_2$-rich liquid sorbent stream from a $CO_2$ absorption unit and recovering a substantially pure $CO_2$ stream.

Referring now to the schematic illustration of FIG. 1, the system 100 in accordance with the invention is shown downstream of a conventional $CO_2$ absorption unit 10 that contains appropriate packing material 12 and includes raw flue gas inlet line 14 and treated flue gas outlet 16 for discharging a reduced $CO_2$-content gas. The adsorption unit 10 receives $CO_2$-lean liquid sorbent at inlet 18 and discharges the $CO_2$-rich liquid sorbent through sorbent outlet 19 that is in fluid communication with sorbent pump 20. The temperature of the sorbent in the absorption zone is in the range of from 30° C. to 40° C. The $CO_2$-lean sorbent flow rate is proportional to the flow rate of the combustion gas in $CO_2$ capture unit 10 in order to maximize the $CO_2$ absorption.

The pressurized $CO_2$-rich liquid sorbent stream is passed to system 100 of the invention and into heating zone 30 and enters first heat exchanger 32 where its temperature is increased by heat exchange with returning $CO_2$-lean liquid sorbent stream 18 that is being recycled to absorption unit 10, as will be described in more detail below. The hot sorbent heat exchanger 32 and optional auxiliary exchanger 36 are dimensioned and configured based on the volume of liquid sorbent to be processed and the desired range of the temperature increase. The design parameters and selection of these components are well within the capabilities of the skill in the art.

The hot $CO_2$-rich liquid sorbent passes from heat exchanger 32 and optionally, if necessary to raise the sorbent to the desired desorption temperature, to auxiliary heat exchanger 36, having heated fluid inlet 35 and fluid outlet 37. Any available hot process fluid, e.g., the hot flue gas prior to $CO_2$ removal, can be passed through auxiliary heat exchanger 36 to increase the sorbent temperature.

The heated sorbent is then passed into the specially configured cyclone separator 40 where it is introduced via inlet 42 to the open interior space and subjected to centrifugal forces in a downwardly spiraling flow path. The now unconfined hot liquid sorbent releases the free $CO_2$ which leaves the body of the cyclone separator 40 via a central riser outlet 44. The $CO_2$ stream, which typically includes water vapor and possibly small amounts of other vaporized compounds from the liquid sorbent, is passed to condenser 70 where it is introduced via inlet 72. A substantially pure stream of $CO_2$ is discharged from condenser outlet 74; the condensate is removed via liquid outlet 76 which is fitted with conventional valves and controls (not shown).

The hot $CO_2$-lean liquid sorbent flows downwardly through the cyclone 40 under the effect of gravity and is discharged via outlet 49 that is in fluid communication with recycle pump 22. As described above, the hot recycle sorbent stream 17 passes in heat exchange with the cooler $CO_2$-rich sorbent in heat exchanger 32 as it is returned to absorption unit sorbent inlet 18. Also shown in FIG. 1 is an optional storage vessel 80 for make-up sorbent solution that is in fluid communication with recycle pump 22 via valve 82 and 3-way valve 84.

Any of the liquid sorbent solutions known in the art for the capture of $CO_2$ from flue gases and other combustion streams can be used in the method of the invention. The liquid sorbent can be organic, e.g., amine or an amine-containing compound, or an inorganic material, e.g., 20% aqueous $K_2CO_3$. It is to be understood that other known liquid sorbent solutions can be used in the practice of the process and system of the invention. For the purpose of the present description and working examples, the invention will be described with reference to a sorbent solution comprising aqueous $K_2CO_3$. In the system described, the $CO_2$-rich sorbent temperature is raised to the range of 80° C. to 85° C. in the heating zone 30.

The absorption unit 10 can be of any known and conventional design and does not form a part of the present invention. The flue or other combustion gases containing $CO_2$ are continuously passed through the absorption unit 10 to contact the liquid sorbent that is preferably continuously fed in counter-current flow with sufficient residence time to optimize absorption of the $CO_2$ from the gas stream. In the absorption zone, the inlet temperature of the flue gas is maintained at between 30°-40° C. The $CO_2$ rich sorbent exits the absorption unit 10 and is passed to the regeneration unit 100 of the invention where it is preheated before regeneration of the sorbent; $CO_2$ is separated from the sorbent at a temperature of about 80° C. to 85° C. in a continuous operation and at high efficiency. The system and method of the invention will be understood to compare favorably to the higher energy requirements of the conventional regeneration processes that require $CO_2$ desorption temperatures in the range of from 100° C.-125° C.

Figure 2:
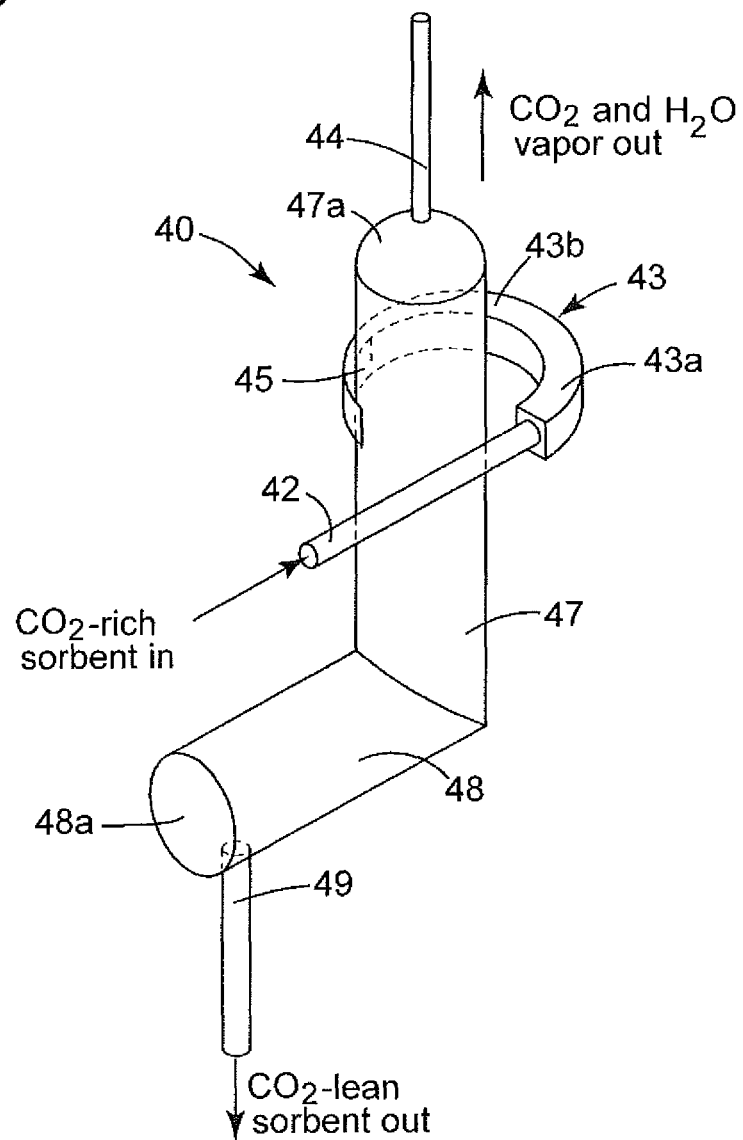
FIG. 2 is a simplified perspective view of an embodiment of a cyclone separator for use in the method and system of the invention.
Figure 3A:
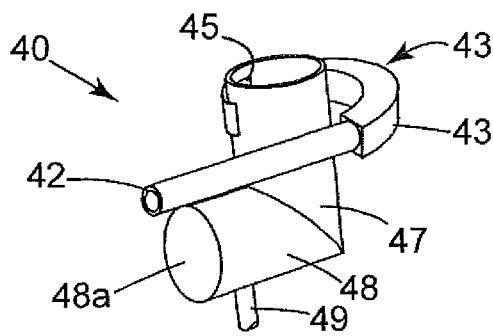
FIGS. 3A-3F are, respectively, a series of four top and side perspective views taken from different orientations, a front elevation view and a top plan view of an embodiment of a portion of a cyclone separator system for use in the invention.
Figure 3B:
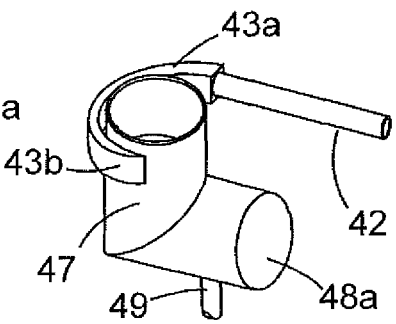
Figure 3C:
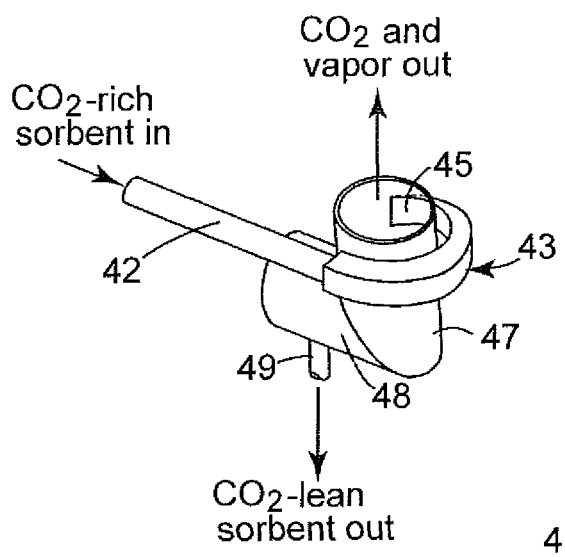
Figure 3D:
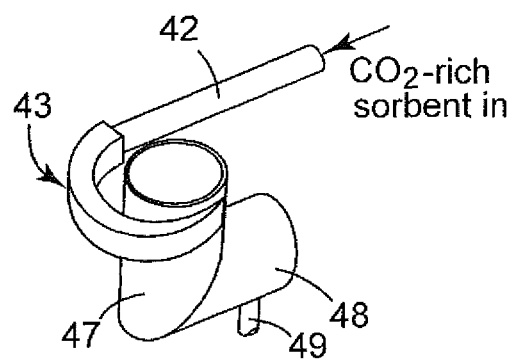
Figure 3E:
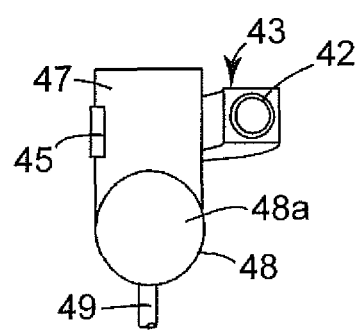
Figure 3F:
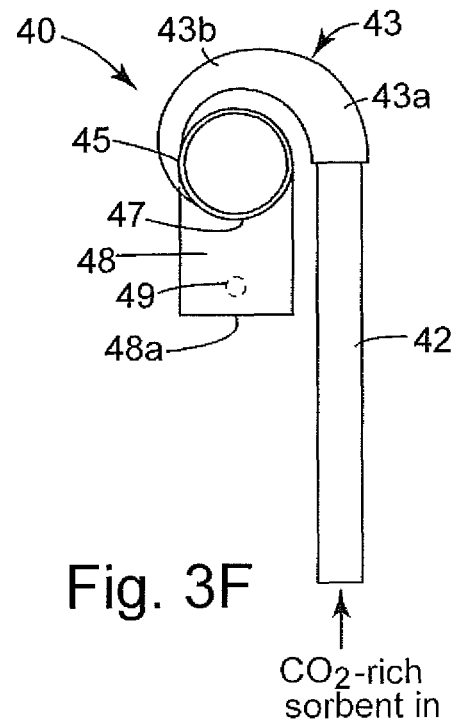

A cyclone separator system 40 that is especially suitable for use in the practice of the invention and the sorbent regeneration method is further illustrated in FIG. 2. The apparatus includes, in series, a heating zone 30 and the gas-liquid separator system 40 which regenerates the sorbent rapidly and at a relatively lower temperature than is required in the methods of the prior art. The preheating of the mixture before its entry into the cyclone separator system 40 provides sufficient energy under the reduced pressure conditions to release the liquid sorbent-$CO_2$, bond and desorb the $CO_2$, while the cyclone separator operates on the liquid sorbent by physical separation under centrifugal forces to thereby enhance the separation efficiency within the relatively low temperature range and reduces the residence time for the recycling of the sorbent and the recovery of $CO_2$. The cyclone separator system 40 has no moving parts and can function continuously essentially without maintenance.

Referring now to the simplified perspective view of the cyclone separator system 40, the heated $CO_2$-rich liquid sorbent enters via sorbent conduit 42, which as illustrated, is round with a cross-sectional area proportional to its diameter D1. The outlet of sorbent conduit 42 mates in fluid-tight relation with the entry portion 43a of cyclonic member 43 and their respective axes are preferably oriented at about 0°, i.e., there is no significant change in the longitudinal or axial direction of flow of the heated sorbent as it passes from heat transfer zone 30 to the sorbent conduit 42 and into the entry portion 43a of the cyclonic member 43. The flow entering is essentially tangential as it enters the spiral section of 43b. Any turbulence in the passage of the liquid sorbent from sorbent conduit 42 to the entry portion 43a can be eliminated or minimized, e.g., by a tapered or conical connecting segment (not shown).

Referring now to FIGS. 3 and 4, illustrating the cyclone separation system 40 in more detail, the moving liquid is subjected to centrifugal forces that result in a more rapid and efficient separation of $CO_2$ from the sorbent. The vortex formed in the cyclone provides a zone of open space in the center of the cyclone, which zone is of reduced pressure and promotes the escape of $CO_2$ as the sorbent moves towards the periphery of the cyclonic member due to its relatively higher density. The direction of the flow of the sorbent is downward due to the gravitational force acting upon it; the released $CO_2$ moves toward the center of the cyclone and upwardly and opposite to the direction of the movement of the sorbent. The length of the path of the liquid sorbent in the cyclonic member is predetermined to maximize the amount of $CO_2$ released from the sorbent to provide the $CO_2$-lean recycle stream.

As used herein, the term "area" means the cross-sectional area taken normal to the longitudinal axis of a straight segment or the radius of curvature of an arcuate segment of the pipe or conduit carrying the flowing sorbent. For ease of reference and to facilitate the further description of the cyclonic separation unit, certain cross-sections are defined as circular and having a diameter "D". In general, pipe and tubing stock is round, but other tubular shapes can be used and the corresponding areas calculated.

Figure 4A:
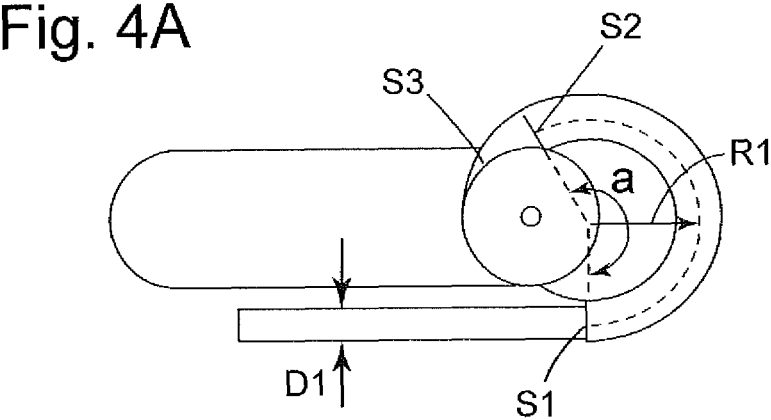
FIGS. 4A and 4B are, respectively, simplified schematic dimensioned top plan and side elevation views of a cyclone separator system for use in the invention.
Figure 4B:
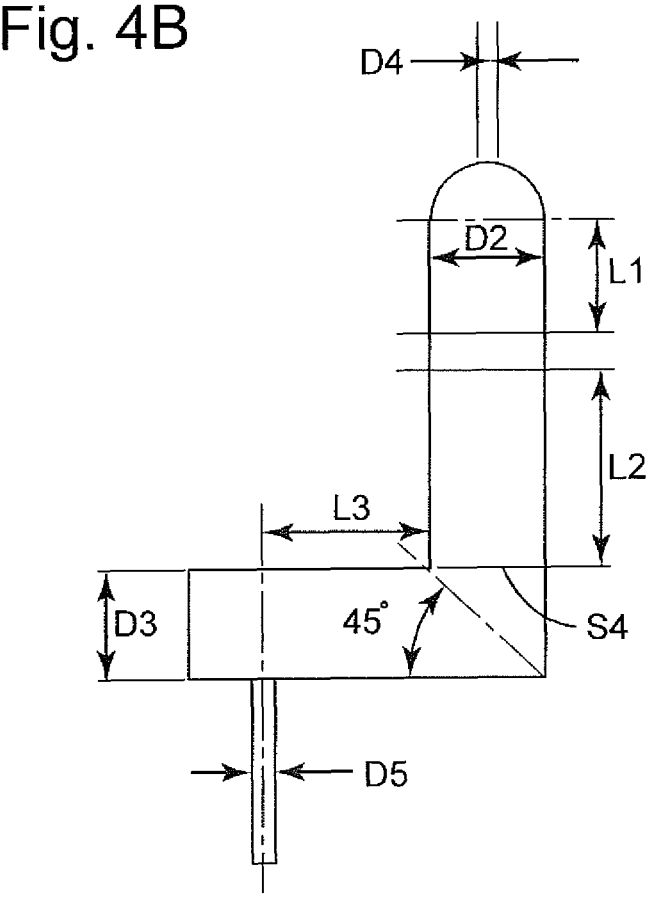

Referring now to the dimensioned illustrations of FIGS. 4A and 4B, the symbols employed have the following significance: D represents the diameter of a circular pipe, S represents the cross-sectional area of the referenced element at the position indicated, R is the radius of curvature of the referenced element, $\alpha°$ is the angle bounded by the indicated arc, and L is the length of the referenced element. The element numbers have been omitted from FIGS. 4A and 4B in the interest of clarity.

A preferred embodiment of the cyclone separator system 40 will be described in further detail with reference to its rotational section and its cyclonic vertical section. The rotational section includes (a) the controlled rotational member 43 which is located between. cross-section (S1) and cross-section (S2); and (b) the connecting element to the cyclonic vertical section 47 located between cross-section (S2) and cross-section (S3).

As shown in FIG. 4A, and with reference to the element numbers of FIGS. 2 and 3A-3F, D1 is the diameter of sorbent conduit 42, S1 is the area of the inlet of the entry portion 43a and S2 is the area of the spiral section 43b proximate the inlet 45 to the cyclonic vertical section 47, The area of the inlet opening 45 is identified as S3, The opening angle $\alpha°$ defines the arc prescribed between the cross-sections corresponding to S1 and S2 along the cyclonic member 43.

In FIG. 4B, D2 is the diameter of the vertical section 47 with a cross-section S4 and D3 the diameter of the horizontal section 48 which vertical and horizontal elements, as shown, are normal to each other. The diameter of the $CO_2$ outlet 44 is defined as D4. The length of the vertical pipe above the cyclonic entrance 45 to the cyclonic vertical section 47 is L1, L2 is the length from below the cyclonic entrance to the intersection of the top of the horizontal member, and L3 is the length along the horizontal member 48 from the intersection of the vertical member to the center line of the discharge conduit 49.

The following Table includes the design parameters and relationships that represent certain preferred embodiments of the system of the invention for the processing of an aqueous $K_2CO_3$ liquid sorbent.

TABLE

| | |
|---|---|
| Outlet area (S2)/inlet area (S1) | $0.7 < S_2/S_1 < 1.05$ |
| Radius of curvature (R1) | $2 < R1/D1 < 6$ |
| Opening angle ($\alpha°$) | $150° < \alpha° < 250°$ |
| Entry area (S1) to outlet cross-section area (S3) | $2 < S3/S1 < 5$ |
| Vertical diameter (D2) | $1.2 < D2/D1 < 5$ |
| Length of vertical pipe above cyclonic entrance (L1) | $1.2 < L1/D2 < 3$ |
| Length of vertical pipe below cyclonic entrance (L2) | $1.5 < L2/D2 < 5$ |
| Diameter of horizontal pipe (D3) | $2 < D3/D1 < 5$ |
| Length of horizontal pipe (L3) | $1.2 < L3/D3 < 5$ |
| Discharge conduit diameter (D5) | $0.05 < D5/D3 < 0.4$ |
| Discharge conduit diameter (D4) | $0.05 < D4/D3 < 0.4$ |

The radius of curvature R1 can continuously decrease or decrease in a step-wise manner along the path of the sorbent, for example, where the shape of cyclonic member 43 is a spiral, or a portion of a spiral, or R1 can be in the form of two or more arcuate sections having different radii of curvature that are joined to produce a smooth linear flow path that accelerate the sorbent as it enters opening 45 and descends along the walls of vertical section 47.

With reference to FIGS. 3A-3F and 4, a $CO_2$-rich mixture coming from the sorption unit 10 via sorbent conduit 42 having a diameter (D1) enters separator 40 tangentially at the cross-section (S1). The cross-sectional area of the entry section (S1) for the incoming sorbent is preferably at least 10 percent greater than the area of conduit 42.

The rotational velocity attained by the liquid in its passage through the cyclone separator is related to the radius of curvature (R1) of the center-line of the pre-rotational element. The radius of curvature (R1) is preferably in the range of from $2<R1/D1<6$ with an opening angle in the range $150°<\alpha°<250°$.

The flow from the pre-rotation entry portion 43a from cross- section (S2) passes section (S3) via the connecting section 43b to the cyclonic vertical section 47 with a high rotational velocity that generates the cyclone having a low pressure central region that facilitates desorption and collection of the $CO_2$. The ratio between connecting element outlet section (S3) and inlet cross section (S2) is preferably maintained in the range of from $2<S3/S1<5$.

As noted above, the system and method of the invention performs efficiently at relatively much lower temperatures during desorption than systems of the prior art. In the heating zone, the temperature of the $K_2CO_3$ sorbent-$CO_2$ is raised to about 80° C., and following heating, the heated sorbent mixture is passed through the cyclonic member at a central region lower pressure to enhance desorption of $CO_2$ at an accelerated rate by physical separation under the additional effect of the centrifugal forces. This effect has the significant benefit of enhancing the separation efficiency at a relatively lower temperature as compared to the processes of the prior art. This, in turn, reduces the residence time at the desorption temperature, thereby extending the useful life of the sorbent. The novel design parameters of the cyclone separator system 40 described above enhances the physical separation of $CO_2$ from the sorbent. More specifically, the sorbent and $CO_2$ mixture with high rotational velocity enters the controlled cyclonic vertical pipe from. section (S3) and the $CO_2$ gas molecules rapidly separate from the liquid sorbent under the cyclonic effect.

Cyclones are formed in the upper and the lower section of the cyclonic vertical section 47. In the upper section, the mixture is characterized by high $CO_2$ concentration, while in the lower section the mixture is characterized by the lower $CO_2$ concentration in the $CO_2$-lean liquid sorbent.

The internal diameter (D2) of the tubular member 47 as measured in any horizontal plane preferably in the range $1.2<D2/D1<5$. The internal diameter D2 is preferably constant from the top to the bottom.

The upper end of cyclonic vertical section 47 is fitted with the $CO_2$ and vapor discharge conduit 44 having a diameter in the range $0.05<D4/D2<0.4$.

The apparatus is dimensioned and configured according to the properties of the incoming mixture, and a large percentage of the $CO_2$ in the sorbent is released and exits the separator from the upper $CO_2$ discharge conduit 44; the $CO_2$ lean sorbent passes from the vertical member at cross-section (S4), through the horizontal member 48 to recycle conduit 49 for recycling to the absorber 10.

The diameter (D3) of the horizontal member 48 as measured in a vertical plane is preferably in the range $2<D3/D1<45$, and is preferably constant over the length of the member. The length (L3) is preferably in the range of from $1.2<L3/D3<5$.

The sorbent with reduced $CO_2$ concentration, i.e., the $CO_2$-lean liquid sorbent is removed from the separator via a recycle conduit 49 attached to an outlet in the lower portion of horizontal member 48 which is sealed by an end cap 48a. The internal diameter (D5) of the recycle conduit is preferably in the range of from $0.05<D5/D3<0.4$.

As will he understood from the above description, the centrifugal force on the liquid sorbent increases as the effective radius R1 of the cyclone rotational section 43b decreases to form a spiral path followed by the liquid moving through the system. Once the sorbent leaves the pressurized condition of sorbent conduit 42 and enters to larger cross-sectional area of the pre-rotational entry portion 43a, the vapor pressure of the $CO_2$ increases. As the $CO_2$ is withdrawn from the cyclone's central area, the kinetics favor he continued escape from the liquid sorbent until an equilibrium is reached for the prevailing conditions of temperature and pressure in the system.

From the above description, it will be understood that the present invention differs from the method and apparatus of U.S. Pat. No. 8,337,603 (the '603 patent) in which the return member is open to discharge the liquids. When the apparatus 30 is positioned at the inlet of a horizontal gravity separation vessel 14, as shown in FIG. 1 of the '603 patent, a favorable guide vane effect is achieved when the return member 38 is configured and positioned with the outlet 40 facing towards the upstream end plate 20 of vessel 14. In embodiments in which apparatus 30 is positioned at the inlet of a vertical gravity separator, the cyclonic member 36 can be oriented in any vertical plane, depending on the position of the inlet of the vessel and outlet. In the present invention, the return member 48 is closed and the sorbent is discharged through an opening in the bottom through recycle conduit 49.

In a preferred embodiment, the elements comprising the cyclone separator are insulated against heat loss to the ambient atmosphere in order to conserve the energy added to desorb the $CO_2$. The elements carrying the heated sorbent include the sorbent conduit 42, the cyclonic member 43, the vertical section 47 and horizontal section 48, and the return recycle conduit 18 which passes through heat exchanger 32.

The importance of insulation to the conservation of energy across the system 100 increases with the decrease of the ambient air temperature.

EXAMPLES

In the examples that follow, a 20% aqueous sorbent solution of $K_2CO_3$ was contacted with two nitrogen gas mixtures having $CO_2$ concentrations of 5.1% and 13.9%, respectively. A constant flow rate of liquid and the gas mixture was maintained at 0.85 L/min and 6.5 L/min, respectively, for the two $CO_2$ concentrations. The operating conditions were as follows:

Absorber Temperature: 33° C.;
Regenerator Temperature: approximately 83° C.; and
Run Time—approximately 15 minutes.

Figure 5:
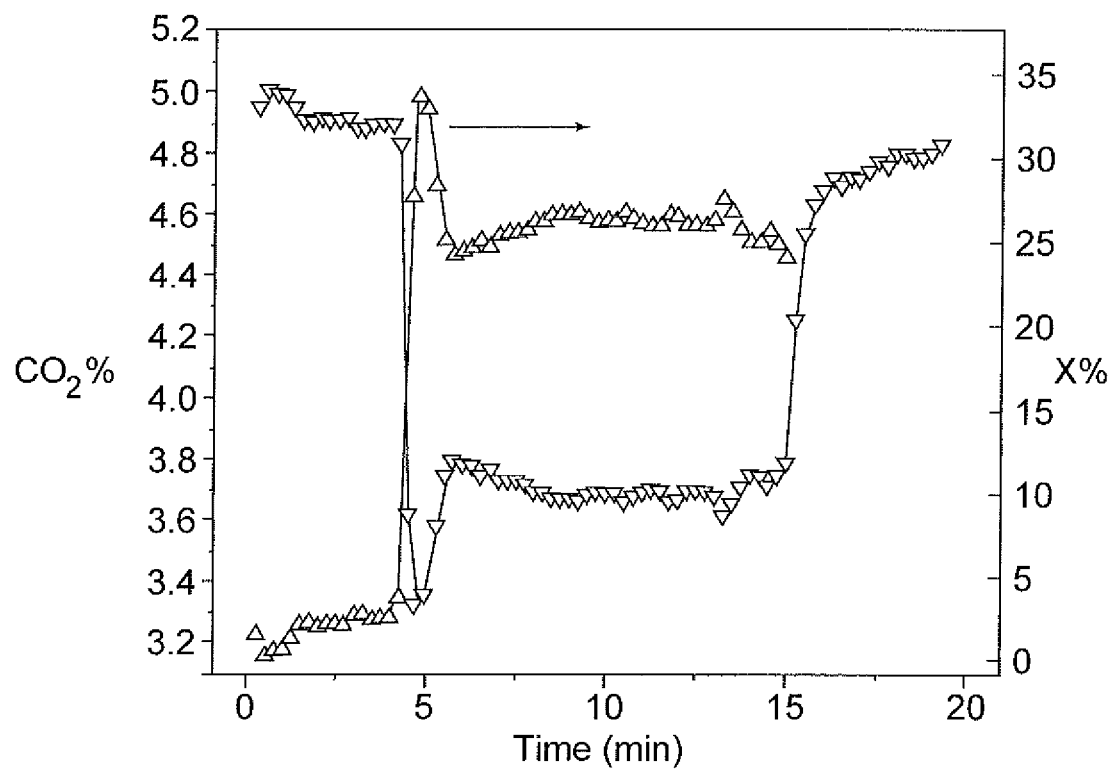
FIG. 5 is a graphic plot of the concentration of $CO_2$ and the corresponding percentage of $CO_2$ absorption in the liquid sorbent from Example 1.
Figure 6:
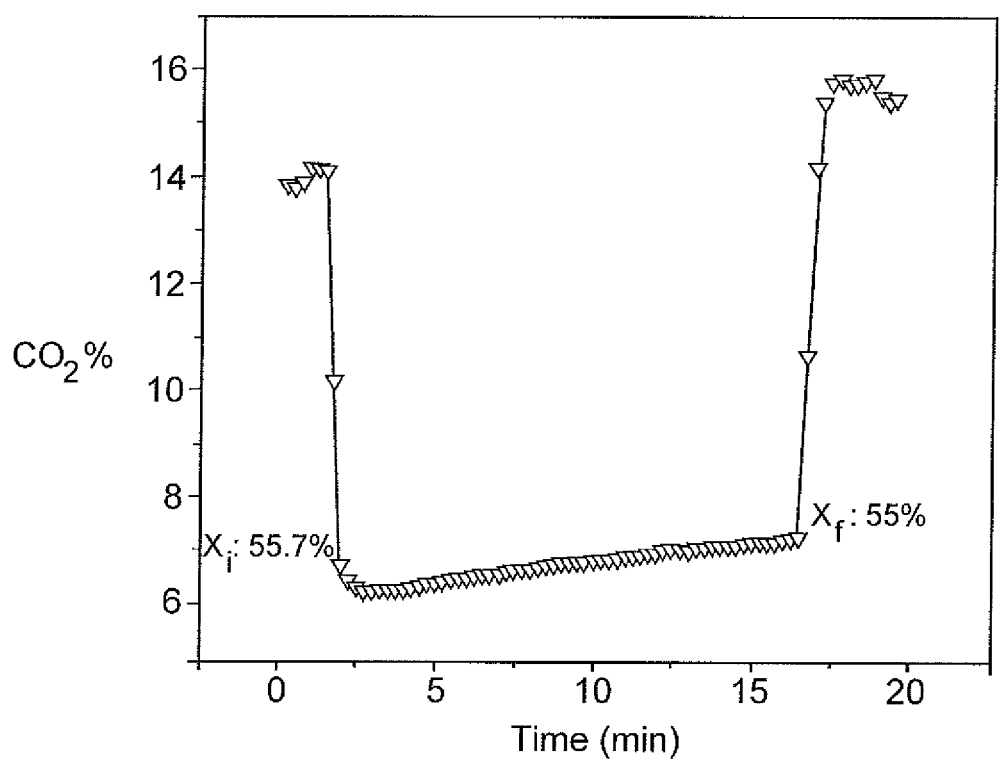
FIG. 6 is a graphic plot of conditions corresponding to those of FIG. 5 showing the $CO_2$ concentrations from Example 2.

The test results showed a $CO_2$ absorption of 25% for the concentration of 5% CO2 in the feed gas and $CO_2$ absorption of 55% for the 13.9% $CO_2$ in the feed gas. The tests were continued for numerous absorption cycles. Detailed descriptions of the test results are shown in FIGS. 5 and 6. The tests demonstrated that with the $CO_2$-lean sorbent continuously flowing through the $CO_2$ absorption unit to capture $CO_2$, the sorbent exiting the unit was rich with absorbed $CO_2$ gas. The $CO_2$ rich sorbent entered the cyclone separator regeneration unit of the invention and released $CO_2$ continuously. The $CO_2$ lean sorbent leaving the regeneration unit was continuously recycled to the absorption unit for further $CO_2$ absorption.

Example 1

The concentration profile of $CO_2$ before (region I/baseline), during (region II/absorption) and after (region III/back to baseline) the $CO_2$ absorption test using the absorption unit in dotted lines is shown in FIG. 5. Additionally, the absorption percentage is calculated and is represented by the dashed line in FIG. 6.

The entire process is operated continuously for many cycles so that while absorption of $CO_2$ is taking place in the absorption unit at 33° C., desorption of $CO_2$ is taking place at 83° C. in the cyclone separator regeneration unit. The combined effect of temperature-driven regeneration and the mass transfer-driven cyclonic effect accelerates $CO_2$ desorption from the sorbent.

In region I, the gas mixture that by-passed the absorption and desorption steps and entered the gas analyzer directly showed a $CO_2$ concentration in the gas mixture of about 5 vol %. It is noted that both the absorption and regeneration units were already operating to establish a steady state without the gas mixture entering the units. As soon as the gas mixture flow is directed to the absorption unit, region II of the test shows in FIG. 5 that there is a sharp decrease in $CO_2$ concentration and immediately a sharp inflection point at 3.3% $CO_2$ before the gas mixture concentration stabilizes at 3.8% $CO_2$. At the end of region II, the gas mixture by-passed the absorption unit and the gas mixture concentration returned to the level of region I, thereby confirming that the absorption test results that appear in region II occurred as a result of the $CO_2$ absorption which was equal to 25% in the sorbent, i.e., $5.1-3.8 \div 5.1 = 0.25$.

Example 2

Another representative test result is depicted in FIG. 6 which shows that the concentration of $CO_2$ in the feed gas mixture before (region I) is 13.9% and that in region II, 55% of the CO$_2$ was absorbed. The process was continuously operated for numerous cycles so that while absorption of CO$_2$ occurred in the absorption unit at 35° C., desorption of CO$_2$ occurred at 83° C. in the regeneration unit cyclone separator. From the data recorded in region III where the gas mixture by-passes absorption, the observed CO$_2$ concentration returned to a higher concentration of 16%, which was comparable to the concentration of region I. It was determined that this discrepancy was attributable to imperfect flow control during this series of tests.

Although the invention has been described in detail above and in the attached drawings and examples which illustrate specific embodiments, further modifications and variations will be apparent to those of ordinary skill in the art from this description and the scope of the invention is to be determined by the claims which follow.

The invention claimed is:

1. A process for the separation and recovery of carbon dioxide from a CO$_2$-rich liquid sorbent stream derived from a CO$_2$ absorption unit, the process comprising:
   a. increasing the temperature of the CO$_2$-rich liquid sorbent from the CO$_2$ sorption temperature to a predetermined desorption temperature by passing the stream in a conduit under pressure through a heating zone (30);
   b. passing the heated pressurized CO$_2$-rich liquid sorbent from the heating zone through a sorbent conduit in a generally linear flow path;
   c. introducing the heated CO$_2$-rich liquid sorbent stream from the sorbent conduit (42) into an entry portion (43*a*) of a cyclonic member (43) under reduced pressure to initiate the desorption of CO$_2$ from the CO$_2$-rich liquid sorbent and thereafter passing the liquid sorbent stream into a spiral section (43*b*) of the cyclonic member (43) which terminates in a decreasing radius of curvature while maintaining a non-turbulent flow of the liquid sorbent;
   d. passing the liquid sorbent and desorbed CO$_2$ through an inlet (45) into an upper section of a closed cylindrical cyclonic vertical section (47);
   e. recovering CO$_2$ desorbed from the sorbent in a central open region of the cyclonic vertical section (47) and passing the CO$_2$ through a CO$_2$ discharge riser outlet (44) conduit that is in fluid communication with the upper region of the cyclonic vertical section;
   f. recovering at the base of the cyclonic vertical section a CO$_2$-lean liquid sorbent stream from which the CO$_2$ was desorbed from a horizontal section 48 of cyclonic vertical section (47); and
   g. recycling the CO$_2$-lean sorbent stream to the CO$_2$ absorption unit.

2. The process of claim 1 which includes
   h. passing the CO$_2$ recovered from the riser outlet (44) to a condenser (70) in a condensing zone to separate from the CO$_2$ from any water vapor and other compounds desorbed from the liquid sorbent; and
   i. recovering a substantially pure stream of CO$_2$ gas from the condensing zone.

3. The process of claim 1 in which the cyclonic vertical section (47) is of generally circular cross-section.

4. The process of claim 3, in which diameter of the circular cross-section is uniform.

5. The process of claim 1, where the cross-sectional area of the cyclonic member (43) increases over its length.

6. The process of claim 1 in which the cyclonic member (43) circumscribes an angle in the range of from 150° to 250° between the entry portion and the inlet (45) of the cyclonic vertical section (47).

7. The process of claim 1 in which the liquid sorbent follows a path of a descending spiral in the cyclonic member (43) proximate the inlet (45) before passing into the cyclonic vertical section (47).

8. The process of claim 1 in which the flow path of the cyclonic member (43) is comprised of arcuate sections having different diameters.

9. The process of claim 1 in which the CO$_2$-lean sorbent recycle-stream from step 1(g) is passed in heat exchange with the CO$_2$-rich sorbent from the CO$_2$ desorption unit.

10. The process of claim 1 in which the liquid sorbent is an aqueous solution of K$_2$CO$_3$ and the sorbent is heated in step 1(a) to a temperature in the range from 80° C. to 85° C.

11. The process of claim 9 in which the temperature of the recycled CO$_2$-lean sorbent is reduced to 40° C. or lower for return to the CO$_2$ adsorption unit.

* * * * *